United States Patent Office 3,804,947
Patented Apr. 16, 1974

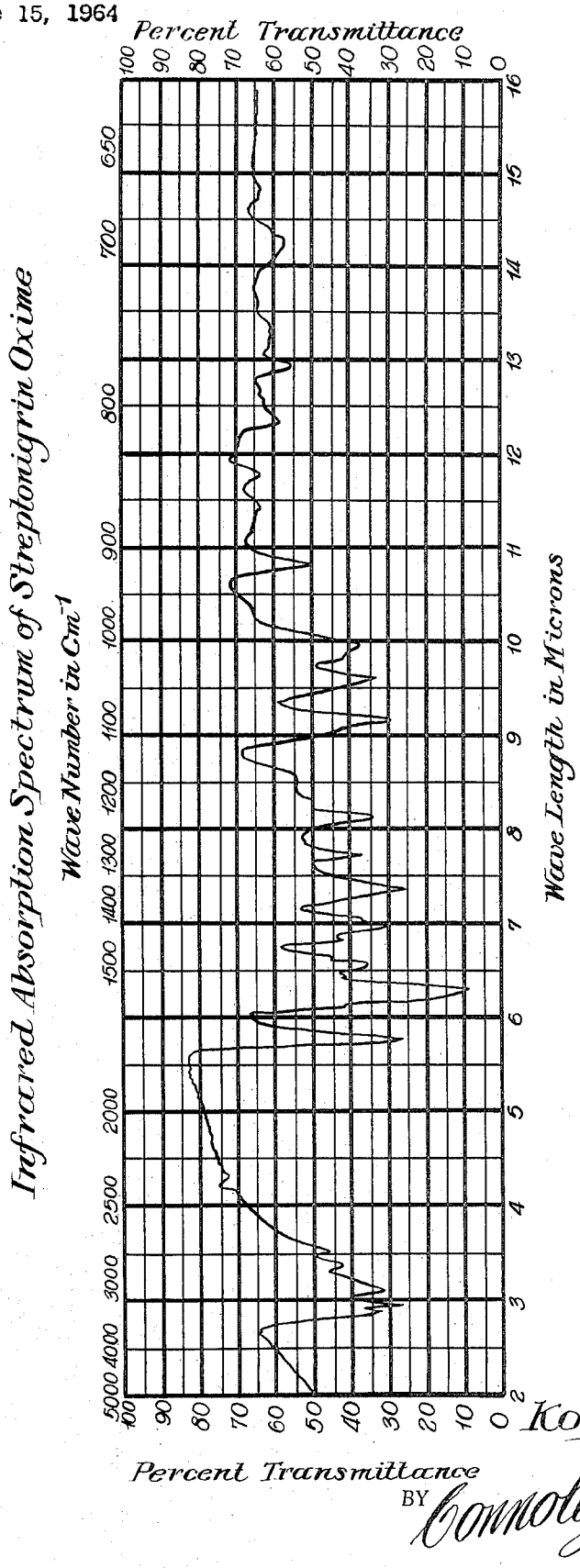
Fig. 1. Infrared Absorption Spectrum of Streptonigrin Oxime

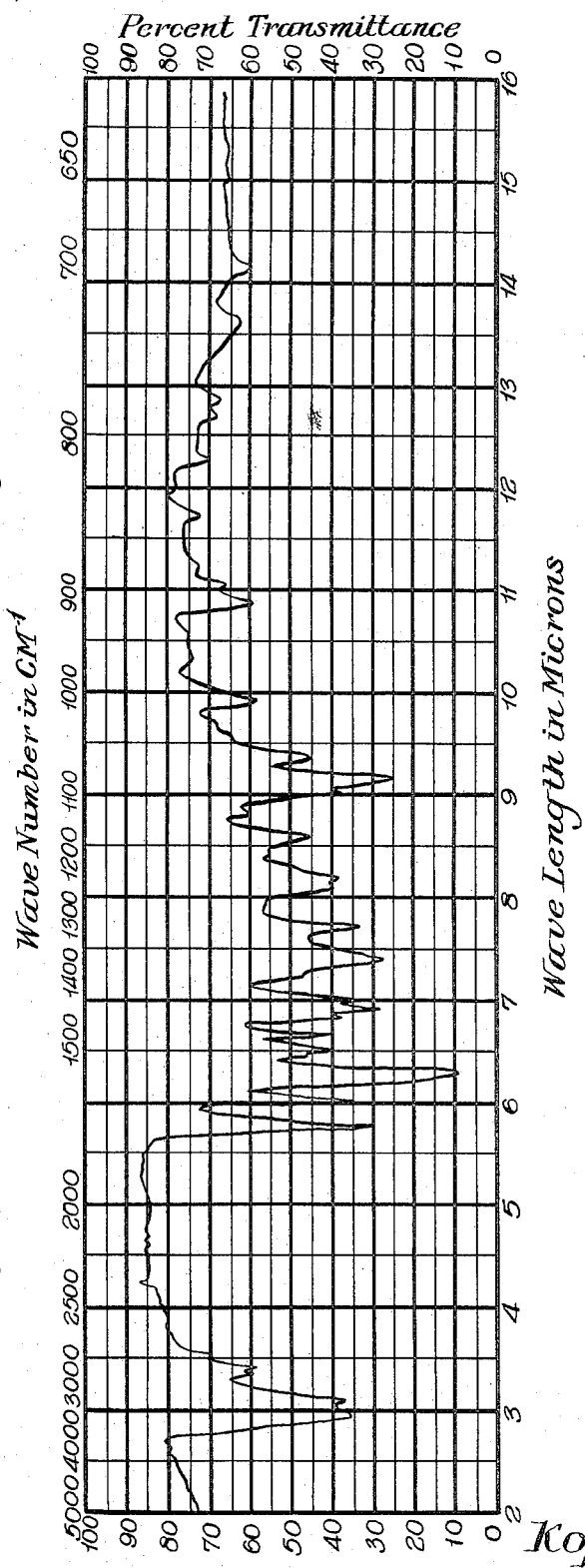

3,804,947
ISOPROPYLIDENE AZASTREPTONIGRIN AND STREPTONIGRIN-MONOXIME
Koppaka V. Rao, Pine Brook, N.J., assignor to Pfizer Inc., New York, N.Y.
Continuation-in-part of abandoned application Ser. No. 204,874, dated June 25, 1962. This application June 15, 1964, Ser. No. 376,296
Int. Cl. A61k 27/00
U.S. Cl. 424—119  2 Claims

ABSTRACT OF THE DISCLOSURE

Novel derivatives of streptonigrin are prepared, particularly the monoxime and isopropylideneazastreptonigrin and their esters and salts. (Streptonigrin is known chemically as 5 - amino -6 - (6 - methoxy-5,8-dihydro-7-amino-5,8-dioxo-2-quinoyl) - 4 - (2 - hydroxy - 3,4 - dimethoxyphenyl)-3-methyl-picolinic acid.)

This invention relates to a series of novel complexing agents and to methods for their production. More particularly, it relates to novel derivatives of streptonigrin and to methods for their production and purification.

Streptonigrin, known chemically as 5-amino-6-(6-methoxy-5,8-dihydro-7 - amino - 5,8 - dioxo - 2 - quinolyl) - 4-(2-hydroxy-3,4-dimethoxyphenyl)-3 - methyl - picolinic acid, is an acidic substance which behaves as a weak monobasic acid. The many and varied substituent groups in its complex structure render it capable of reaction with a variety of reagents. The valuable and novel products of this invention, (1) streptonigrin monoxime and esters thereof, (2) the amine obtained therefrom by reduction, (3) azastreptonigrin, the oxidation product of said amine and (4) isopropylidene azastreptonigrin and esters thereof form complexes with polyvalent metal ions, particularly with the heavy metal ions, e.g., copper (II), nickel (II), cobalt (II), calcium (II), iron (III). The complexes are quite soluble in non-aqueous systems and only slightly soluble in water. This property, of course, renders them useful for a variety of purposes wherein metal ion contamination presents a problem, e.g., stabilizers in organic systems, metal extraction, biological experimentation. They are further useful in the analysis of polyvalent metal ions which may be complexed or extracted by these materials and as metal carriers. Other uses common to sequestering agents are also apparent for these compounds.

Certain of these derivatives, in particular, the streptonigrin monoxime and isopropylidene azastreptonigrin (previously called the oxime and hydroxime of streptonigrin, respectively are useful for medical research purposes however their antibacterial activity is low.

Furthermore, streptonigrin also possesses inhibitory activity for both gram-positive and gram-negative bacteria. However, there are certain disadvantages in using streptonigrin. Streptonigrin is a relatively unstable compound in solution. In buffered solutions (pH 7–8) or in solutions of aqueous organic solvents such as 10% ethanol or 10% acetone, the compound decomposes to biologically inactive products. This decomposition is hastened by light and by an increase in the pH of the solution. Furthermore, in alkaline solutions such as 0.1 N sodium hydroxide the decomposition is complete in about 1 hour at room temperature and within a few minutes at 100° C.

Streptonigrin monoxime and isopropylidene azastreptonigrin on the other hand exhibit unexpected stability in solution. In buffered solutions or in solutions of aqueous organic solvents, these two derivatives of streptonigrin are relatively stable. Furthermore, the stability is not impaired by light or changes in pH. They are unusually stable in alkaline solutions. For example, contacting either isopropylidene azastreptonigrin or the monoxime with 1 N sodium hydroxide for a period of 24 hours has no effect on the compounds. Both derivatives exhibit a greatly decreased cytotoxic activity against Hela cells in tissue culture which may be advantageous in that undesirable side effects due to cytotoxicity may be avoided.

The valuable and novel products of this invention are readily and conveniently prepared from streptonigrin. The monoxime of the present invention is readily prepared by reacting streptonigrin with hydroxylamine hydrochloride in the presence of a suitable solvent at elevated temperatures. The resultant solution is cooled, concentrated to a thick syrup, diluted with water, acidified, and the resultant solid filtered. The monoxime thus formed may be purified by any number of means, such as, for example, recrystallization from suitable solvents or mixtures of solvents, or by column chromatography.

A satisfactory solvent in which to carry out the reaction is pyridine at reflux temperatures. The monoxime may be recrystallized from solvents such as methanol, ethanol, mixtures of methanol and chloroform, or mixtures of ethanol and water. Purification by column chromatography may be effected by packing the column with materials such as diethylaminoethyl cellulose, silicic acid-cellulose mixture, and the like.

Reduction of the monoxime catalytically, e.g., hydrogenation in glacial acetic acid in the presence of platinum oxide, or chemically, e.g., sodium dithionite, produces the corresponding amino compound, dihydroazastreptonigrin, a yellowish crystalline substance. This product is very susceptible to oxidation by air and rapidly changes to a red-brown quinonimine, azastreptonigrin. The oxidation is accomplished by bubbling air or oxygen into a solution of the intermediate amine or simply by agitating a solution of the intermediate while exposing it to the atmosphere.

The unstable monoxime reduction product, dihydroazastreptonigrin, reacts readily with carbonyl compounds. Acetone, for example, forms an isopropylidene derivative which on oxidation by air produces a maroon quinonoid substance referred to as isopropylidene azastreptonigrin. Other carbonyl compounds which react similarly are chloral, p-dimethylaminobenzaldehyde and benzophenone. Dihydroazastreptonigrin also reacts with α-diketones to form bright yellow, stable, crystalline quinoxaline type derivatives. Diacetyl, for example, forms a product having the composition $C_{29}H_{27}O_7N_5$ as bright yellow needles. These carbonyl condensation products function as polyvalent metal ion complexing agents.

The monoxime of streptonigrin is slightly soluble in the lower alcohols, chloroform, ethyl acetate and acetone, moderately soluble in pyridine and dimethyl acetamide. It is readily soluble in aqueous sodium hydroxide and moderately soluble in aqueous sodium bicarbonate. The monoxime exhibits characteristic absorption maxima at the following wave lengths in the infrared region of the spectrum when measured on a potassium bromide pellet containing 1% of the product: 3450, 3390, 3200, 2950, 2835, 1730, 1585, 1550, 1525, 1470, 1435, 1358, 1295, 1230, 1090, 1039, 1002, 923, 848, 810, 772 and 702 cm.$^{-1}$. The curve is more particularly illustrated in FIG. 1. The monoxime exhibits ultraviolet absorption maxima at 380 mu $$E_{1cm.}^{1\%} = 400$$

295 mu $$E_{1cm.}^{1\%} = 300$$

and 240 mu $$E_{1cm.}^{1\%} = 565$$

When crystallized from a mixture of ethyl acetate and chloroform, it is obtained as a bright orange-red crystalline solid which melts at 283–285° C. Elemental analysis reveals approximately 55.99% carbon, 4.64% hydrogen and 13.06% nitrogen. The balance is accounted for by oxygen. The calculated empirical formula is $C_{25}H_{23}O_8N_5 \cdot H_2O$. The composition required for this formula is 55.6% carbon, 4.67% hydrogen and 12.98% nitrogen. It is weakly acidic and appears to have a quinonoid type structure. The monoxime gives a dark greenish brown color with ferric chloride.

Esterification of the monoxime with a lower alcohol, e.g., methanol and an acid catalyst gives a monomethyl ester of composition $C_{26}H_{25}O_8N_5$. Reaction with diazomethane produces a trimethyl derivative. Methylation with dimethylsulfate and potassium carbonate in acetone solution provides a neutral compound having the composition $C_{30}H_{35}O_{12}N_5S$. This material is the quaternary salt of the trimethyl derivative which can be formulated as $C_{28}H_{29}O_8N_5,(CH_3)_2SO_4$.

Isopropylidene azastreptonigrin is slightly soluble in the lower alcohols, chloroform, ethyl acetate and acetone, and readily soluble in pyridine, dimethyl acetamide and 0.1 N sodium hydroxide. It exhibits characteristic absorption maxima at the following wave lengths in the infrared region of the spectrum when measured on a potassium bromide pellet containing 1% of the product: 3400, 3240, 3000, 2950, 2840, 1735, 1652, 1580, 1535, 1500, 1460, 1448, 1430, 1350, 1295, 1235, 1220, 1185, 1165, 1130, 1108, 1090, 1062, 1008, 918, 903, 889, 851, 812, 785, 775, 735 and 704 cm.$^{-1}$. The curve is more particularly illustrated in FIG. 2. In the ultraviolet region absorption maxima occur at 380 mu., $$E_{1cm.}^{1\%} = 350$$

300 mu;

$$E_{1cm.}^{1\%} = 185$$

and 246 mu;

$$E_{1cm.}^{1\%} = 800 \pm 20$$

When crystallized from a mixture of methanol and chloroform it is obtained as maroon-red needles which do not melt below 300° C. Elemental analysis reveals approximately 62.22% carbon, 5.12% hydrogen and 12.69% nitrogen. The balance is accounted for by oxygen. The calculated empirical formula $C_{28}H_{25}O_7N_5$ requires 61.87% carbon, 4.64% hydrogen and 12.89% nitrogen. It is a weakly acidic material, $pK_a = 6.3-6.5$, and is stable in aqueous alkali.

Esterification of isopropylidene azastreptonigrin with methanolic acid or with diazomethane produces a monomethyl ester, $C_{29}H_{27}O_7N_5$, and a trimethyl derivative, $C_{31}H_{31}O_7N_5$, respectively. Methylation with dimethyl sulfate-potassium carbonate in acetone forms a quaternary salt, $C_{31}H_{31}O_7N_5,(CH_3)_2SO_4$, as was observed in the case of the monoxime. Other lower alcohols also produce mono esters, e.g., ethyl, isopropyl and butyl esters.

EXAMPLE I

Streptonigrin monoxime

Method A.—A solution of streptonigrin (5 g., 0.01 mole) in pyridine (100 ml.) is treated with hydroxylamine hydrochloride (3 g., 0.04 mole) and the mixture refluxed for 2–4 hours. The solution is concentrated to remove most of the pyridine and the residue diluted with acid to pH 4.0. The red solid is filtered and crystallized first from methanol and subsequently from dioxane-ethanol (1:4). It separates out as bright red needles which melt at 283–285° C. Yield 3.5 g.

Analysis.—Calculated for $C_{25}H_{23}O_8N_5H_2O$ (percent): C, 55.65; H, 4.67; N, 12.98. Found (percent): C, 55.99; H, 4.64; N, 13.06.

Method B.—A solution of streptonigrin (5 g., 0.01 mole) in pyridine (50 ml.) is refluxed with hydroxylamine hydrochloride (1.5 g., 0.02 mole) for 2 to 4 hours. The solution is cooled and concentrated to a thick syrup under reduced pressure. The residue is diluted with water, acidified to pH 4.0 and the dark red solid filtered. The product is crystallized first from methanol and then from a mixture of methanol and chloroform. Yield of the crystalline solid, 4 g.

Further purification may be carried out as follows: the crude material is taken up in chloroform and added to a column of silicic acid-cellulose mixture (2:1) in chloroform (1 g. to 50 g. of the adsorbent). The column is developed with chloroform and subsequently with a mixture of ethyl acetate and chloroform (1:3). The corresponding fractions are concentrated and the product crystallized. The monoxime crystallizes as a bright orange-red crystalline solid which melts at 283–285° C. The product exhibits characteristic ultra-violet and infrared absorption spectra as disclosed above. The products of Methods A and B are identical.

Method C.—The monoxime is prepared by the method of B above and purified as follows: the crude material is taken up in a mixture of pyridine and methanol (1:3) and added to a column of DEAE (diethylaminoethyl) cellulose made up in methanol (1 g. of crude material to 5–10 g. of DEAE cellulose). The column is washed with methanol and then eluted with 1% acetic acid in methanol. The monoxime moves as a bright red band. The fractions are combined, concentrated and the crystalline material recrystallized from a mixture of ethyl acetate and chloroform. The oxime is obtained as a bright orange-red crystalline solid which melts at 283–285° C. The oxime exhibits the characteristic ultraviolet and infrared absorption spectra as hereinbefore disclosed.

EXAMPLE II

Esterification of streptonigrin monoxime

A solution of the monoxime of streptonigrin (0.5 g.) in dioxane (10 ml.) is diluted with methanol (50 ml.) and the mixture refluxed with 1 ml. of boron trifluoride-etherate for 24 hours. The solution is concentrated, shaken between chloroform and aqueous bicarbonate. The solvent layer is concentrated and the product crystallized from a mixture of methanol and chloroform. The compound appears as dark red prisms, M.P. 283–285° C. The same compound can be prepared by methylation of the monoxime in dioxane-methanol with ethereal diazomethane. After a 5-minute reaction period, the excess diazomethane is decomposed by acetic acid and the compound worked up as above.

Analysis.—Calculated for $C_{26}H_{25}O_8N_5,1/2H_2O$ (percent): C, 57.36; H, 4.81; N, 12.86; $OCH_3(4)$, 22.80. Found (percent): C, 57.39; H, 4.80; N, 12.96; $OCH_3$, 22.58.

Repetition of this procedure but using ethanol, n-propanol, isopropanol and butanol in place of methanol produces the corresponding ethyl, n-propyl, isopropyl and butyl esters.

EXAMPLE III

Quaternary salt of trimethyl streptonigrin monoxime

A mixture of streptonigrin monoxime (0.5 g.), dimethyl sulfate (1 ml.) and potassium carbonate (5 g.) in acetone (50 ml.) is refluxed for 20 hours. The reaction mixture is filtered, the filtrate concentrated to dryness and the residue shaken between chloroform and aqueous sodium hydroxide. The solvent layer is concentrated to dryness and the product crystallized from methanol. It separates as bright red prisms, M.P. 226–228° C.

Analysis.—Calculated for $C_{28}H_{29}O_8N_5,(CH_3)_2SO_4,H_2O$ (percent): C, 51.20; H, 5.28; N, 10.03; $OCH_3(8)$, 35.10. Found (percent): C, 51.52; H, 5.53; N, 9.99; $OCH_3$, 34.27.

EXAMPLE IV

Azastreptonigrin

A finely divided suspension of the monoxime of streptonigrin (0.5 g.) in methanol (50 ml.) is treated with a strong aqueous solution of sodium dithionite while the mixture is kept boiling. The solid turns bright yellow (dihydroazastreptonigrin) and, after 15 minutes at reflux, water (50 ml.) is added and the solid filtered rapidly. It is taken up in methanol and aerated for 3–4 hours. The dark brown solution is concentrated and the concentrate shaken between water and ethyl acetate. The solvent layer is concentrated to dryness and the product crystallized from methanol-chloroform as reddish brown small prisms, M.P. 288–290° C.

Analysis.—Calculated for $C_{25}H_{23}O_7N_5,H_2O$ (percent): C, 57.36; H, 4.81; N, 13.38. Found (percent): C, 57.51; H, 4.68; N, 11.62.

EXAMPLE V

Isopropylidene azostreptonigrin

Method A.—The reduction of the monoxime of streptonigrin with sodium dithionite is carried out as described under (IV). The dihydroazastreptonigrin is taken up in acetone and the solution aerated for 4 hours. The mixture is concentrated, the solid filtered and recrystallized from methanol-chloroform (1:1). The compound separates as maroon red prisms, M.P. 300° C.

Analysis.—Calculated for $C_{28}H_{25}O_7N_5$ (percent): C, 61.87; H, 4.64; N. 12.89. Found (percent): C, 62.22; H, 5.12; N, 12.69.

Method B.—Seven grams of the monoxime of Example I in glacial acetic acid (50 ml.) is hydrogenated in presence of 0.2 g. of Adam's catalyst at 50 lbs. pressure for 4 to 6 hours. The yellow reaction mixture is filtered and the residue washed with acetone. During the filtration the solution begins to turn reddish brown due to aerial oxidation. The solution is oxidized completely by shaking on a mechanical shaker while air or oxygen is solution is concentrated to dryness and the residue washed twice with isopropyl ether to remove the acetic acid. The residue is taken up in hot chloroform (200 ml.), and the clear solution shaken with 50 g. of a 2:1 silicic acid-cellulose mixture. The suspension is then put on a column made up from 200–250 g. of the same mixture in chloroform.

At least 2 and sometimes 3 bands appear on the column. The first band is eluted with chloroform. On purification the material from this band is obtained as a brown crystalline solid which shows all the characteristics of azastreptonigrin such as the infrared spectrum, microbiological and anti-tumor activity. Yield 0.3–0.5 g.

The second band which is eluted with 1:3 ethyl acetate-chloroform is obtained as a red crystalline solid from a mixture of methanol and chloroform (1:1). It shows the infrared spectrum identical with that of the oxime. Yield 0.3–0.5 g.

The third and major fraction, isopropylidene azastreptonigrin, is eluted by 1:1 ethyl acetate and chloroform. The product from this crystallizes from a mixture of methanol and chloroform as maroon-red needles which show no melting point below 300° C. Yield 2.0–2.5 g. It exhibits the characteristic ultra-violet and infrared absorption spectra as hereinbefore disclosed and is identical to the product obtained in Method A.

EXAMPLE VI

Isopropylidene azastreptonigrin monomethyl ester

A solution of isopropylidene azastreptonigrin (0.5 g.) in methanol (50 ml.) is heated under reflux with 1 ml. of boron trifluoride etherate for 20 hours. The mixture is concentrated, shaken between chloroform and aqueous bicarbonate and the solvent layer concentrated to dryness. The product separates from methanol-chloroform as dark red prisms, M.P. 285–288° C.

Analysis.—Calculated for $C_{29}H_{27}O_7N_5,3H_2O$ (percent): C, 56.95; H, 5.44; N, 11.45; $OCH_3(4)$, 20.4. Found (percent): C, 57.14; H, 4.99; N, 11.44; $OCH_3$, 22.20.

Repetition of this procedure but substituting methanol by ethanol, n-propanol, isopropanol and butanol produces the corresponding ethyl, n-propyl, isopropyl and butyl esters.

EXAMPLE VII

Trimethyl isopropylidene azastreptonigrin

A solution of isopropylidene azastreptonigrin (0.5 g.) in dioxane-methanol (50 ml. of 1:3) is heated with an excess of diazomethane. After 16 hours the solution is concentrated, the residue shaken between chloroform and aqueous sodium hydroxide and the solvent layer concentrated to dryness. The product is crystallized from acetone-methanol as bright orange-red plates, M.P. 238–240° C.

Analysis.—Calculated for $C_{31}H_{33}O_7N_5$ (percent): C, 63.36; H, 5.66; N, 11.92; $OCH_3(6)$, 31.80. Found (percent): C, 63.31; H, 5.71; N, 12.10; $OCH_3$, 32.58.

Repetition of this procedure but using streptonigrin monoxime in place of isopropylidene azastreptonigrin produces the trimethyl derivative of streptonigrin monoxime.

EXAMPLE VIII

Quaternary salt of trimethyl isopropylidene azastreptonigrin

A mixture of isopropylidene azastreptonigrin (0.5 g.), dimethyl sulfate (1 ml.) and potassium carbonate (5 g.) in acetone (50 ml.) is refluxed for 20 hours. The filtered reaction mixture is concentrated and the concentrate shaken between chloroform and aqueous sodium hydroxide. The solvent layer is concentrated to dryness and the solid crystallized from acetone-methanol. The product forms bright red needles, M.P. 218–220° C.

Analysis.—Calc'd. for $C_{31}H_{31}O_7N_5,(CH_3)_2SO_4,3H_2O$ (percent): C, 51.75; H, 5.64; N, 9.15; $OCH_3(8)$, 32.4. Found (percent): C, 51.59; H, 5.41; N, 9.69; $OCH_3$, 33.90.

EXAMPLE IX

Streptonigrin monoxime (0.5 g.) is reduced with sodium dithionite as described under (IV). Instead of filtration, the reaction mixture is refluxed with diacetyl (1 g.) for 4 hours. The solution is concentrated, the solid filtered and crystallized from methanol-chloroform. The compound separates as bright yellow needles, M.P. 286–288° C.

Analysis.—Calculated for $C_{29}H_{27}O_7N_5,H_2O$ (percent): C, 60.51; H, 5.08; N, 12.17. Found (percent): C, 60.20; H, 5.11; N, 12.23.

EXAMPLE X

The metal complexes of streptonigrin monoxime, isopropylidene azastreptonigrin, azastreptonigrin, and dihydroazastreptonigrin are formed as follows. $10^{-3}$ mole of the complexing agent is dissolved in 5 ml. of dimethylacetamide and diluted to 100 ml. with ethyl acetate. An aqueous solution of the appropriate metal is added to this solution, the mixture is then thoroughly mixed, and the pH of the resulting mixture maintained at the desired level by the addition of dilute aqueous sodium hydroxide.

The ethyl acetate layer is separated and evaporated to dryness to give the metal complex. In this manner complexes are prepared using the following metal salts in equimolar proportions and in 5 molar excess to the complexing agent.

cupric chloride
ferrous sulfate
cobaltous nitrate
calcium acetate
nickel chloride
zinc acetate
chromium acetate
cadmium acetate
cerous acetate Each of these preparations is conducted to the pH values of 2, 5, 7 and 10.

This application is a continuation-in-part of my copending application Ser. No. 204,874 filed June 25, 1962.

What is claimed is:

1. Isopropylidene azastreptonigrin, a crystalline substance, which substance is slightly soluble in lower alcohols, chloroform, ethyl acetate and acetone and readily soluble in pyridine, dimethylacetamide and 0.1 N sodium hydroxide; which crystallizes from a mixture of methanol and chloroform as maroon-red needles which do not melt below 300° C.; which substance exhibits absorption maxima in the ultraviolet region of the spectrum at 380, 300 and 246 m$\mu$ with $$E_{1\,cm.}^{1\%}$$

values of 350, 185 and 800 ±20, respectively; and, when measured in a potassium bromide pellet containing 1% of the substance, exhibits absorption maxima in the infrared region of the spectrum at 3400, 3240, 3000, 2950, 2840, 1735, 1652, 1580, 1535, 1500, 1460, 1448, 1430, 1350, 1295, 1235, 1220, 1185, 1165, 1130, 1108, 1090, 1062, 1008, 918, 903, 889, 851, 812, 785, 775, 735 and 704 cm.$^{-1}$; and which contains the elements carbon, hydrogen, nitrogen and oxygen in the following percentages by weight:

| | |
|---|---|
| Carbon | 62.22 |
| Hydrogen | 5.12 |
| Nitrogen | 12.69 |
| Oxygen (by difference) | 19.97 | which substance is weakly acidic with, a pKa of from 6.3–6.5, and is stable in aqueous alkali; and which when reacted with a lower alkanol and an acid catalyst or with diazomethane produces a mono lower alkyl ester and a trimethyl derivative, respectively; and when methylated with dimethyl sulfate-potassium carbonate in acetone forms a quaternary salt; and which substance forms metal complexes with polyvalent metal ions; the lower alkyl esters, the trimethyl and quaternary derivatives, and the metal complex salts thereof.

2. Streptonigrin-monoxime, a crystalline substance, which substance is weakly acidic, slightly soluble in lower alcohols, chloroform, ethyl acetate and acetone, moderately soluble in pyridine and dimethylacetamide, and aqueous sodium bicarbonate, and readily soluble in aqueous sodium hydroxide; which crystallizes from a mixture of ethyl acetate and chloroform as a bright orange-red crystal and has a melting point of 283°–285° C.; which exhibits absorption maxima in the ultraviolet region of the spectrum at 380, 295 and 240 m$\mu$ with $$E_{1\,cm.}^{1\%}$$

values of 400, 300 and 565, respectively; and, when measured in a potassium bromide pellet containing 1% of the substance, exhibits absorption maxima in the infrared region of the spectrum at 3450, 3390, 3200, 2950, 2835, 1730, 1585, 1550, 1525, 1470, 1435, 1358, 1295, 1230, 1090, 1039, 1002, 923, 848, 810, 772 and 702 cm.$^{-1}$; and which contains the elements carbon, hydrogen, nitrogen and oxygen in the following percentages by weight:

| | |
|---|---|
| Carbon | 55.99 |
| Hydrogen | 4.64 |
| Nitrogen | 13.06 |
| Oxygen (by difference) | 26.31 | which substance provides a dark greenish-brown color with ferric chloride; and when reduced produces dihydroazastreptonigrin, a yellowish crystalline substance, very susceptible to oxidation by air to azastreptonigrin, a red-brown substance; which substance when reacted with a lower alkanol and an acid catalyst or with diazomethane produces a mono lower alkyl ester and a trimethyl derivative, respectively; and when methylated with dimethylsulfate and potassium carbonate in acetone forms a quaternary salt; and which substance forms metal complexes with polyvalent metal ions; the lower alkyl esters, the trimethyl and quaternary derivatives, and metal complex salts thereof.

References Cited
UNITED STATES PATENTS 3,372,090  3/1968  Marsh et al. _____ 424—119

STANLEY J. FRIEDMAN, Primary Examiner